United States Patent [19]

Griffith

[11] 4,418,301

[45] Nov. 29, 1983

[54] CIRCUIT FOR AVERAGING A PLURALITY OF SEPARATE MOTOR SPEED SIGNALS

[75] Inventor: Robert J. Griffith, Erie, Pa.

[73] Assignee: General Electric Company, Erie, Pa.

[21] Appl. No.: 377,282

[22] Filed: May 12, 1982

[51] Int. Cl.³ .............................................. H02P 5/00
[52] U.S. Cl. ................................................... 318/59
[58] Field of Search ................... 318/52, 71, 803, 53, 318/54, 59, 723, 811, 807, 6, 51, 66, 75, 78, 318, 341

[56] References Cited

U.S. PATENT DOCUMENTS

| | | | |
|---|---|---|---|
| 3,713,504 | 1/1973 | Shimer et al. | 318/52 X |
| 3,720,863 | 3/1973 | Ringland et al. | 318/52 |
| 3,832,609 | 8/1974 | Banett et al. | 318/52 |
| 3,871,235 | 3/1975 | Anderson | 73/510 |
| 3,936,663 | 2/1976 | Taylor et al. | 235/150.51 |
| 3,997,822 | 12/1976 | Logston, Jr. et al. | 318/71 X |
| 4,006,417 | 2/1977 | Pace | 324/166 |
| 4,031,509 | 6/1977 | Matulevich | 340/62 |
| 4,298,940 | 11/1981 | Tadokoro et al. | 318/52 X |
| 4,327,313 | 4/1982 | Tsuboi et al. | 318/52 |
| 4,327,315 | 4/1982 | Kawada et al. | 318/803 X |
| 4,335,337 | 6/1982 | Okamatsu et al. | 318/52 |
| 4,357,655 | 11/1982 | Beck | 318/811 X |
| 4,363,089 | 12/1982 | Wisman | 318/807 X |

Primary Examiner—J. V. Truhe
Assistant Examiner—Shik Luen Ip
Attorney, Agent, or Firm—Albert S. Richardson, Jr.

[57] ABSTRACT

A circuit having means responsive to a plurality of electric signals representative, respectively, of the speeds of a plurality of traction motors in a propulsion system for a traction vehicle, wherein the circuit provides a digital output signal having a frequency representative of the average speed of the respective motors.

14 Claims, 6 Drawing Figures

CIRCUIT FOR AVERAGING A PLURALITY OF SEPARATE MOTOR SPEED SIGNALS

BACKGROUND OF THE INVENTION

This invention relates generally to a speed averaging circuit and more particularly to such a circuit for use in controlling a plurality of adjustable speed electric motors on an electrically propelled traction vehicle.

In an electric propulsion system for a large traction vehicle such as a diesel-electric locomotive or rapid transit car, a plurality of adjustable speed electric motors are respectively coupled in driving relationship to two or more axle-wheel sets of the vehicle. Suitable means is provided for controlling all of the motors so that they operate in unison to propel (or to retard) the vehicle. For proper operation, the motor controls are conventionally supplied with certain command and feedback signals, including feedback signals representative of the revolutions per minute (RPM) of the traction motors. In practice the rotational speeds of the respective motors may differ from one another due to small differences in wheel diameters, or due to a temporary wheel slip (or slide) condition that is not shared equally by all of the axle-wheel sets.

Others have heretofore disclosed circuits in which a plurality of different speed signals are so processed that the lowest (and/or highest) speed is determinative. See U.S. Pats. Nos. 3,871,235; 4,006,417; and 4,031,509. In the present invention, a circuit is provided for combining different speed signals so as to obtain a single feedback signal that represents their *average*.

SUMMARY OF THE INVENTION

Accordingly, a general objective of the present invention is to provide an electric circuit responsive to a plurality of input signals having values respectively representative of the rotational speeds of a plurality of separate motors for developing a speed feedback signal that is truly representative of the average value of the input signals.

Another object of the invention is to apply such a circuit in an electric propulsion system for a traction vehicle.

A more specific object is to provide, in an electric propulsion system for a traction vehicle, a novel circuit responsive to input signals from a plurality of motor speed sensing means for developing a digital speed feedback signal having a frequency representative of average speed for use in controlling the fundamental frequency of alternating current electric power supplied to a plurality of adjustable speed induction motors.

In one form of this invention, a traction vehicle is propelled by a system comprising two or more adjustable speed, 3-phase alternating current (a-c) induction motors. Each motor has stator windings and a rotor, and the rotors of the respective motors are mechanically coupled to separate axle-wheel sets of the vehicle. A plurality of speed sensing means are coupled to the rotors of the respective motors, with each such speed sensor being arranged to provide a separate digital input signal having a frequency that varies with the speed (RPM) of the associated motor. The stator windings of all the motors are connected in parallel to a source of 3-phase a-c power, which source includes a controllable electric power inverter. Means is provided for varying the fundamental amplitude of the a-c power supplied to the motors. In addition, means responsive to an excitation frequency control signal is provided for controlling the operation of the inverter so as to vary the fundamental frequency of the a-c power as desired. The excitation frequency control signal is varied as a function of a digital speed feedback signal which is derived by a "tachometer adder" circuit comprising (1) first means connected to all of the speed sensors for developing a single train of discrete output pulses having a frequency proportional to the sum of the frequencies of the digital input signals and (2) second means responsive to the aforesaid output pulses and to the number of speed sensors for producing a digital speed feedback signal having a frequency proportional to the frequency of the output pulses divided by the number of speed sensors. The frequency of the resulting speed feedback signal is representative of the average rotational speed of the respective motors.

The invention will be better understood and its various objects and advantages will be more fully appreciated from the following more detailed specification, of which the appended claims and Abstract and the accompanying drawings form a part.

DESCRIPTION OF THE PREFERRED EMBODIMENT

Figure 1:
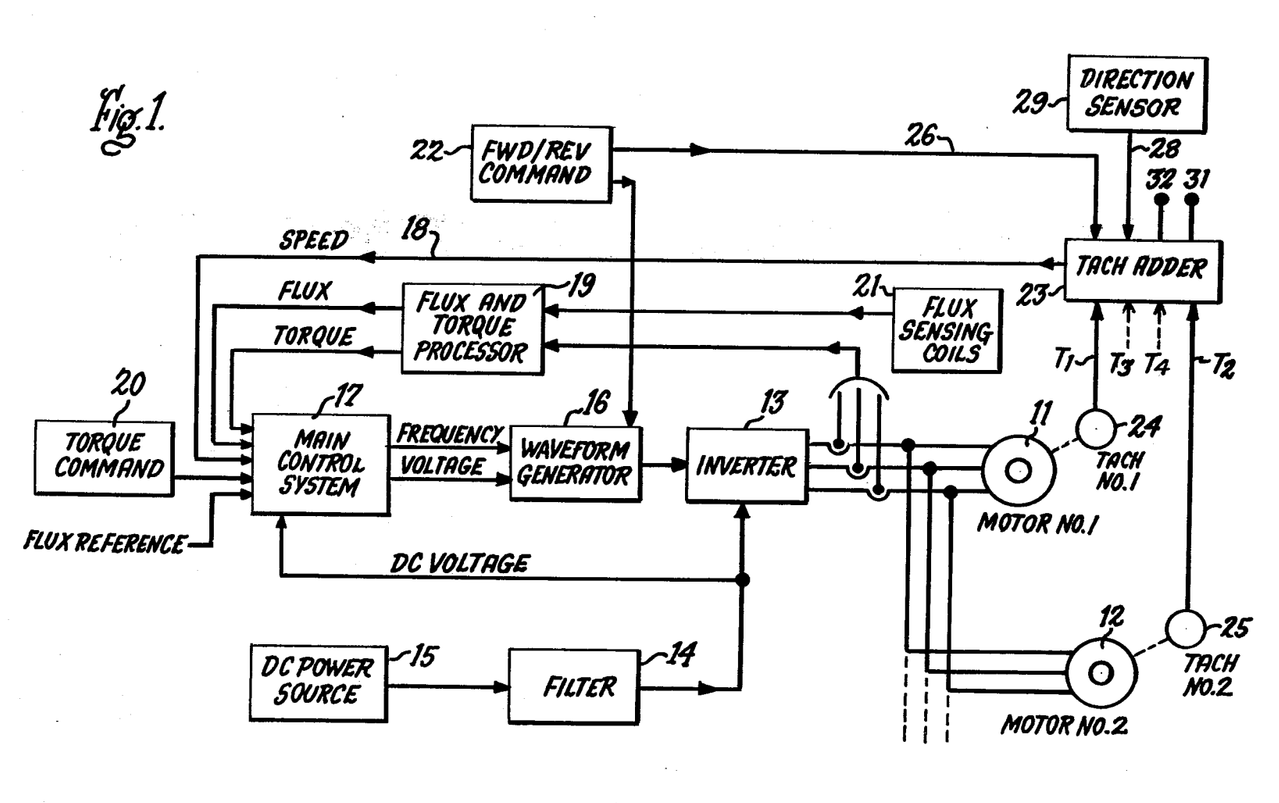
FIG. 1 is a functional block diagram illustrating an adjustable speed a-c electric motor drive system incorporating the novel Tachometer Adder of the present invention.

FIG. 1 shows a drive system for a pair of adjustable speed, 3-phase a-c induction motors 11 and 12 suitable for propelling (or retarding) a large traction vehicle such as a locomotive or rapid transit car (not shown). Each motor has conventional stator windings and a rotor. In practice four such motors can be provided on one vehicle, with their respective rotors mechanically coupled by speed-reducing gearing to separate axle-wheel sets (not shown) of the vehicle. The stator windings of all of the motors are connected in parallel and supplied with 3-phase a-c electric power from a suitable source of excitation which is conditioned so that the fundamental frequency as well as the fundamental amplitude of the a-c power are adjustable as desired and the phase sequence is reversible. The illustrated source of excitation comprises a controllable electric power inverter 13 having direct current (d-c) terminals adapted to be connected via an electric power filter 14 to a d-c power source 15.

The inverter 13 comprises a plurality of controllable electric valves or switching elements (not shown) of a type having the ability to hold off forward voltage until turned "on" in response to suitable firing or gate signals.

Once a valve is triggered or fired by its gate signal, it switches from a blocking or non-conductive state into a forward conducting state which it can freely conduct load current until the valve is subsequently returned to its non-conductive state by the action of associated commutating means or in response to a "turn off" signal. A "voltage fed" type of system is assumed, and the inverter 13 includes suitable means for controlling the frequency and pattern of switching its valves so that the waveform of the alternating voltage developed at its a-c output terminals will conform to a waveform produced by an associated waveform generator 16.

The waveform generator 16 of the inverter control circuit is constructed and arranged so as to generate a desired waveform in which the fundamental sinusoidal component has a frequency determined by an excitation frequency control signal applied on the line labeled "Frequency" and an amplitude determined by an excitation magnitude command signal applied on the line labeled "Voltage." These signals in turn are developed in a block 17 labeled "Main Control System" which receives a motor speed (RPM) feedback signal on a line 18, a d-c voltage magnitude feedback signal, torque and flux feedback signals produced by a flux and torque processor 19, a torque command signal from a block 20, and a flux reference signal. As is indicated in FIG. 1, the processor 19 is connected to current transformers in the a-c output lines of the inverter 13 and to magnetic flux sensing coils 21 associated with the respective motors 11 and 12.

In the main control system 17 the flux feedback and reference signals are compared to produce an excitation magnitude command signal, and the torque feedback and torque command signals are compared to produce a slip frequency signal which is summed with the speed feedback signal to produce the excitation frequency control signal. Preferably, the slip frequency signal with which the speed feedback signal is summed is derived in a manner described in U.S Pat. No. 4,088,934—D'Atre, assigned to the General Electric Company, and in particular at column 8, lines 32–51 and column 13, lines 66 et seq., which patent, in its entirety, is expressly incorporated by reference into the present application. The waveform generator 16 reads the excitation magnitude command signal and the excitation frequency control signal, as well as a vehicle directional signal from a block 22 labeled "Fwd/Rev Command," and it generates a replica of the desired 3-phase alternating voltage. The controls in the inverter 13 respond to the the replica waveform by producing appropriately timed gate signals, whereby the desired voltage waveforms are applied to the stator terminals of both of the traction motors 11 and 12. The fundamental frequency of the resulting motor excitation voltage varies as necessary to minimize any difference between actual and desired values of motor torque. The fundamental amplitude of this voltage tends to vary as necessary to maintain constant flux in the stator-rotor air gaps for optimum motor performance.

As is shown in FIG. 1, the speed feedback line 18 is connected between the means 17 for developing the excitation frequency control signal and a block 23 labeled "Tach Adder." The tack adder 23 receives inputs on lines T1 and T2 from a pair of speed sensing means 24 and 25 that are coupled to the rotors of the respective motors 11 and 12. On a vehicle having three or four traction motors, additional speed sensing means (not shown) would be respectively associated with the extra motor(s), and their inputs would be supplied to the tach adder 23 on the broken lines T3 and T4. Additional inputs to the tach adder are provided by the directional command signal on a line 26 and by a directional feedback signal on a line 28 from a vehicle direction sensor 29. The tach adder 23 provides, on line 18, a digital speed feedback signal the frequency of which is representative of the average angular velocity of the respective rotors of all of the traction motors to which speed sensors are coupled. It also has a pair of output terminals 31 and 32 at which signals representative of the rotational speeds of the individual motors 11 and 12 are respectively developed.

The speed sensing means 24 and 25 are sometimes referred to as tachometer generators. In practice each of these sensors preferably comprises a disc with peripheral teeth (i.e., a gear) disposed for rotation with the rotor of the associated motor and an adjacent pickup coil in which a series of electrical pulses are induced as successive teeth of the gear move past the coil. Alternatively, an optical pulse system could be used if desired. In any case, the speed sensor is arranged to supply to the tach adder 23, via the associated line T1 (or T2, T3, T4, as the case may be), a separate digital input signal having a frequency that varies with the angular velocity of the motor rotor to which the sensor is coupled.

Figure 2:
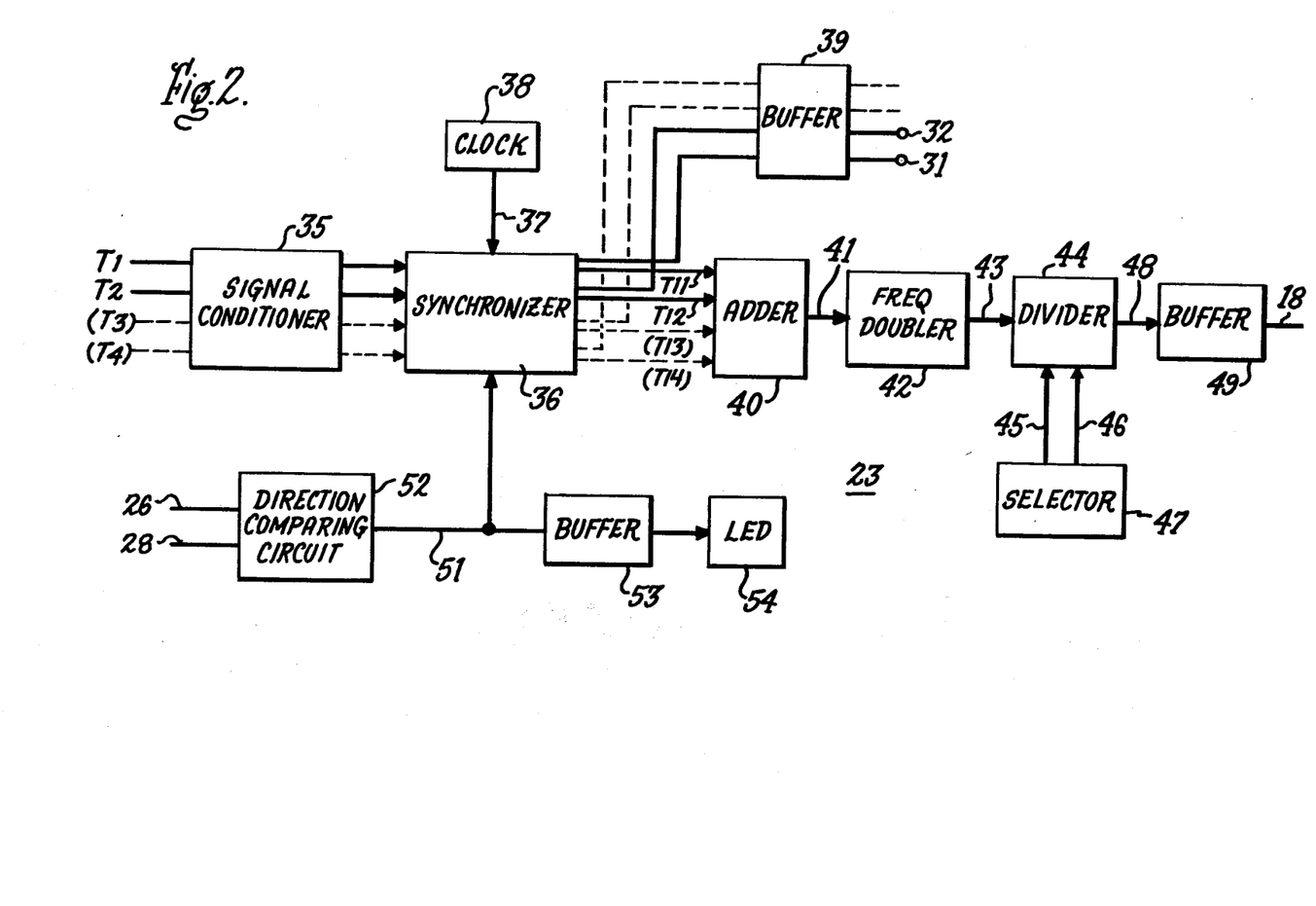
FIG. 2 is a functional block diagram of a preferred embodiment of the "Tach Adder" block shown in FIG. 1.

FIG. 2 shows the presently preferred embodiment of the tach adder 23 in functional block form. The digital input signals on lines T1, T2 (and T3, T4, if used) from the respective speed sensors 24 and 25 are supplied through a signal conditioner 35 to a synchronizer 36. The latter component also receives, via a line 37, repetitive clock pulses which are generated at a relatively high, constant frequency by an oscillator or other suitable source 38 which is labeled "Clock." As will soon be more fully explained with reference to FIG. 3, the synchronizer 36 is so constructed and arranged as to generate two or more individual trains of pulses on lines T11, T12 (and T13, T14, if used), which pulse trains have frequencies that are respectively determined by the frequencies of the input signals on lines T1, T2, etc., and to sychronize the pulses in each of these individual trains with a different series of the clock pulses so that the leading and trailing edges of the generated pulses are not coincident with the leading or trailing edges of the pulses in any other train. Consequently, the pulses in the first train on line T11 have a frequency that varies with the rotational speed of the first motor 11, the pulses in the second train on line T12 have a frequency that varies with the rotational speed of the second motor 12, and no pulse in the second train can either begin or end at the same time as any pulse in the first train is beginning or ending. Similarly, if a third motor and another speed sensor were used, the edges of the pulses in the third train (on line T13) would be time displaced with respect to the edges of any of the pulses in either the first or second train. As can be seen in FIG. 2, the individual pulse train lines T11, T12, etc. from the synchronizer 36 are supplemented by a parallel array of lines for supplying corresponding pulses to a buffer circuit 39 which develops, at the output terminals 31, 32, signals whose frequencies are representative of the rotational speeds of the motors 11 and 12 respectively.

The individual trains of pulses on the family of lines T11, T12 (and T13, T14, if used) are fed to adding means 40 where they are converted into a single train of discrete output pulses which are applied to a line 41. As will be explained below with reference to FIG. 4, the output state of the adder 41 changes in response to every solitary state change of the pulses on any of the lines T11, T12, etc. The synchronizing means 36 ensures that the state changes (i.e., pulse edges) on any one line are displaced in time from the state changes on the other lines of the same family T11, T12, etc., and therefore the frequency of the adder's output state changes will be truly equal to the sum of the state-changing frequencies of the two or more individual trains of pulses. As a result, the adder 40 provides output pulses on the line 41 at a frequency proportional to the sum of the frequencies of the digital input signals on the respective lines T1 and T2 (and T3 and T4, if used).

The output pulses on the line 41 are supplied to a doubler circuit 42 which develops, on its output line 43, a double-frequency digital signal having a frequency equal to twice the frequency of the output pulses from the adder 40. This double-frequency signal provides one input to a divider circuit 44. As is shown in FIG. 2, another input to the latter circuit is provided over lines 45 and 46 by a selector block 47 which is preset or coded in accordance with the number of active speed sensing means 24, 25 on the vehicle. In other words, the input from the selector 47 indicates whether two, three, or four speed sensors are being used. In a manner to be hereinafter described with reference to FIG. 4, the divider 44 produces on its output line 48 a digital signal whose frequency is the quotient of the frequency of the double-frequency signal on line 43 divided by the number of speed sensors. The output signal on line 48 is coupled by a buffer circuit 49 to the speed feedback line 18. It will now be apparent that the frequency of the digital speed feedback signal on line 18 is proportional to the frequency of the output pulses that the adder 40 provides on the line 41 divided by the number of speed sensors, whereby this feedback signal is representative of the average angular velocity of the rotors of the respective motors 11, 12, etc.

The tach adder 23 that is shown in FIG. 2 also includes means for disabling this component, thereby suppressing the speed feedback signal on line 18, in response to any discrepancy between commanded and actual directions of the traction vehicle. Such suppression is desirable in the event the vehicle is being commanded to accelerate in one direction but is actually coasting (due to inertia or gravity) in the opposite direction. In such event a speed feedback signal would provide the inverter controls with erroneous information regarding the speed that the vehicle has attained. To disable the illustrated tach adder, a reset signal is applied to the synchronizer 36 on line 51 from a direction comparing circuit 52. The latter circuit receives the vehicle directional command signal on line 26 as one input and the actual direction feedback signal on the line 28 as another input, and it produces the reset signal on line 51 if these input signals indicate disagreement between commanded and actual directions. Whenever a reset signal is present on line 51, the synchronizer 36 can not generate pulse trains on the lines T11, T12, etc. Line 51 may also be coupled by a buffer circuit 53 to a suitable indicating device 54.

Figure 3:
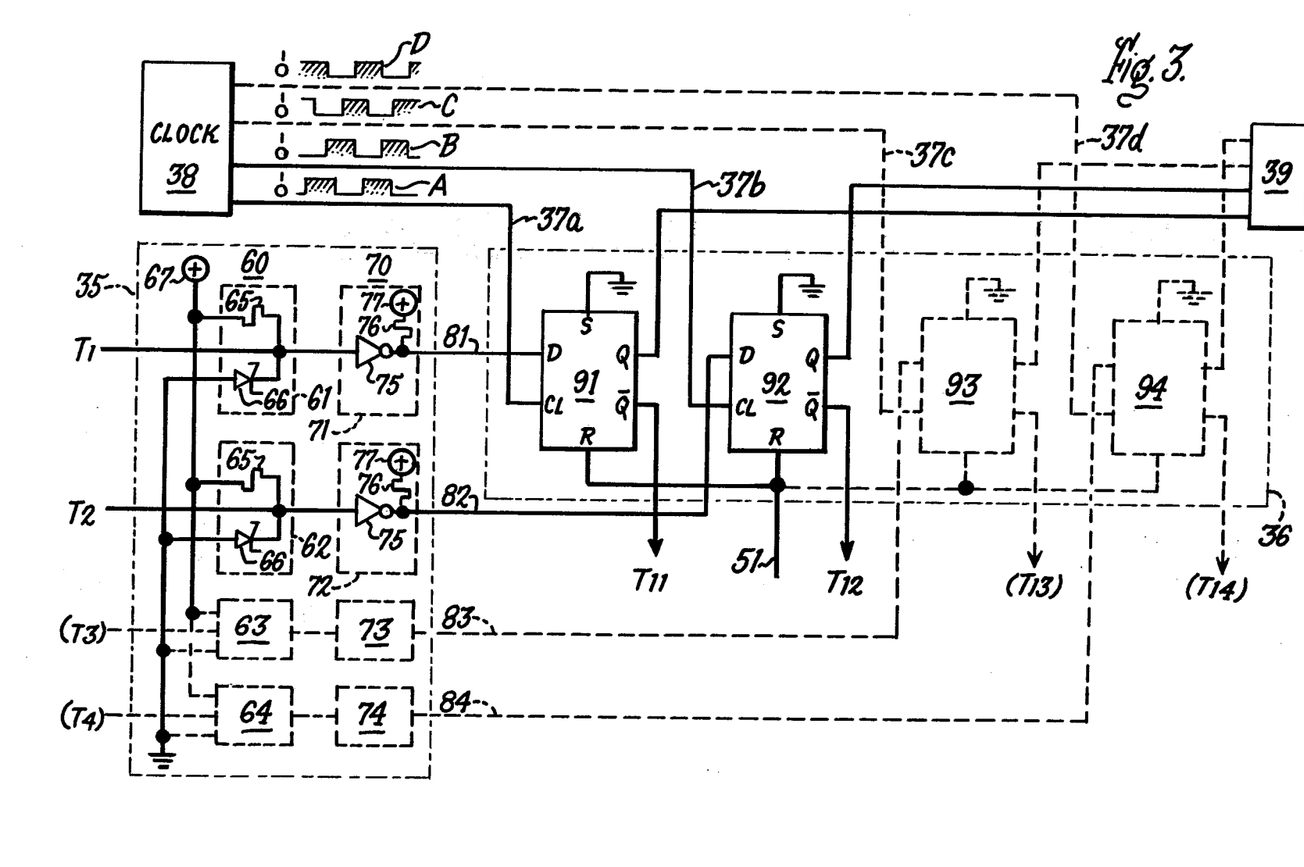
FIG. 3 is a schematic diagram of the circuits in the blocks labeled "Signal Conditioner" and "Sychronizer" in FIG. 2.

More details of the prefered embodiment of the tach adder 23 will now be described with reference to FIGS. 3, 4, 5, and 6. In FIG. 3, the signal conditioner 35 is shown as comprising the combination of a limit circuit 60 and an inverting and level shifting circuit 70. The signal limit circuit 60 comprises two or more substantially identical sections 61, 62, etc. each having a resistor 65 connected in series with a zenor diode 66 between a control power terminal 67 of relatively positive potential and ground. A different one of the digital input signal lines T1, T2 (and T3, T4, if used) from the speed sensors 24, 25 (FIG. 1) is connected to the junction between resistor 65 and zener diode 66 in each section of the circuit 60. The zener diode 66 is effective to limit the voltage on the associated input signal line to a range between zero and a predetermined maximum level that is positive with respect to ground, thereby preventing any negative or undesirably large positive-going voltage transients from appearing on the input line.

The signal inverting and level shifting circuit 70 includes two or more substantially identical sections 71, 72, etc. each comprising a conventional transistor-transistor logic (TTL) inverter 75 having an open collector output. As can be seen in FIG. 3, the input signal lines T1, T2, etc. pass through the limit circuit 60 and are respectively connected to the inputs of the individual inverters 75 in the various sections 71, 72, etc. of the circuit 70. The output of each inverter 75 is connected via a pull-up resistor 76 to a control power terminal 77 of relatively positive potential (e.g., +15 volts). The inverted output signals from sections 71, 72, etc. are supplid over lines 81, 82, etc., respectively, to the synchronizer 36.

Each of the speed sensors (24, 25) includes suitable means (not shown) for normally grounding the associated input signal lines T1, T2. In this grounded state the signal conditioner 35 provides a high or "1" signal on its corresponding output line 81, 82. Periodically, at a frequency that varies with the rotational speed of the associated motor (11 or 12), the grounding means in the speed sensor is temporarily open circuited and the potential on the input signal line rises in a positive sense. During each interval when positive voltage is present on an input signal line, the output of the associated inverter 75 will be in a low or "0" state. Thus the signals on the respective output lines 81, 82, etc. of the signal conditioner 35 will periodically change states from "1" to "0" at frequencies that are determined by the frequencies of the input signals on the respective lines T1, T2, etc. In a practical application of the invention, each of the input signals is in the form of an essentially square wave having a frequency that can vary in a range between zero and 14.4 kilohertz (KHZ).

The synchronizer 36 preferably comprises two or more conventional type D flip-flop devices 91, 92, etc. The output line 81 from section 71 of the signal inverting and level shifting circuit 70 is connected to the D input of device 91, whereby the signal applied to this input is low or "0" during the recurrent intervals when there is positive voltage on the first input signal line T1 and is high or "1" when T1 is at ground potential. Similarly, the output line 82 from section 72 of the circuit 70 is connected to the D input of the flip-flop device 92, whereby the signal applied to this input is "0" during recurrent intervals when positive voltage is applied to the second input signal line T2 and is "1" whenever the second input is "0". The clock inputs "CL" of the respective devices 91, 92 receive clock pulses from source 38 which, in FIG. 3, comprises a multi-phase clock that provides a different series of "1" pulses on each of two or more lines 37a, 37b, etc. to which such inputs are respectively connected. More particularly, the first phase of the clock 38 is connected via line 37a to the CL input of the first device 91 whereby a first series of clock pulses A is supplied to this input, the second phase is connected via line 37b to the CL input of the second device 92 to supply a second series of clock pulses B to this input, with the leading or rising edges (i.e., the low-to-high transitions) of the B pulses being interleaved or staggered in time with respect to the leading edges of the A pulses in the first series, and the additional phases, if used, are respectively connected via the broken lines 37c and 37d to the CL inputs of the other two devices 93 and 94 to supply them with third and fourth series of clock pulses C and D the leading edges of which are staggered with respect to each other and also with respect to the leading edge of each of the pulses A and B.

In response to every 0-to-1 transition of the clock pulses supplied to its CL input, each of the flip-flop devices 91, 92, etc. in the synchronizer 36 operates in a conventional manner to provide at its complementary output terminals (Q and Q bar) signals that are respectively the same as and the opposite of the signal that is then being applied to the D input. For example, assuming that the Q bar output of the first device 91 is low or "0", it will be driven to a "1" state whenever the CL input of this device receives the first series A clock pulse to be generated on line 37a after a 1-0 signal change on the D input. Consequently, any 0-to-1 change in the state of the Q bar output will coincide with the leading edge of a clock pulse. Subsequently, upon receipt of the first clock pulse A to be generated on line 37a after the next 0-to-1 signal change at the D input, the Q bar output is returned to "0", and consequently this 1-to-0 output state change will also coincide with the leading edge of a clock pulse. For proper operation, the constant frequency of the clock 38 should be selected so that the period of the clock pulses A is shorter than the minimum interval between consecutive state changes of the signals applied to the D input of the device 91.

The Q bar outputs of the flip-flop devices 91, 92, etc. are respectively connected to the lines T11, T12, etc., whereas the Q outputs of the same devices are respectively coupled to the terminals 31, 32 (see FIGS. 1 and 2) via the buffer circuit 39. With this arrangement, the synchronizer 36 is able to generate on each of the lines T11 and T12 an individual train of high or "1" pulses having a frequency that varies with the frequency of the digital signal on the corresponding input line T1 or T2 and having alternate state changes that are synchronized with clock pulses on the associated line 37a or 37b. As a result, no two pulses in different trains on the lines T11, T12, etc. will have coincident edges. In other words, each state change of every synchronizer output pulse will be solitary, and no two pulses change states simultaneously. The synchronizer can be disabled by applying a high or "1" signal on the line 51 which is connected to the reset input of all of the devices 91, 92, etc. Such a reset signal will cause the Q bar output of each of these devices to remain in a high state.

Figures 4, 6:
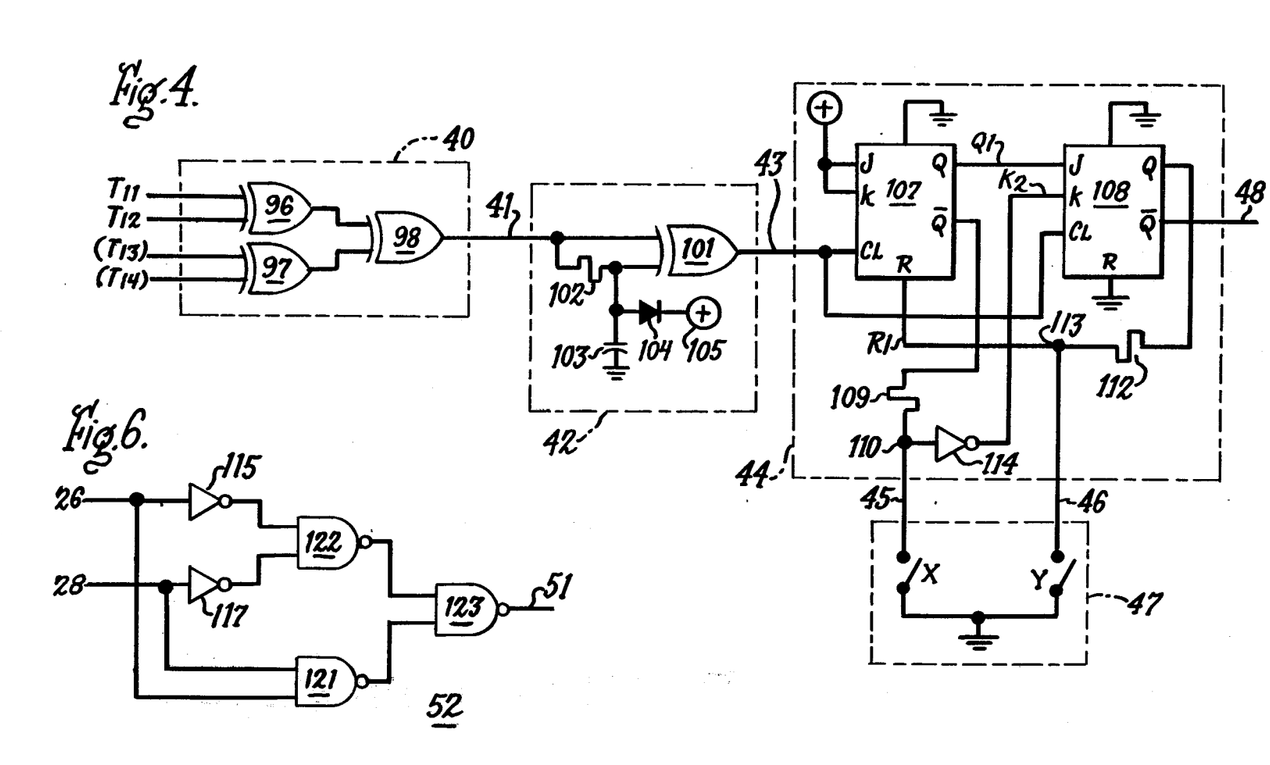
FIG. 4 is a schematic diagram of the circuits in the blocks labeled "Adder," "Freq Doubler," and "Divider" in FIG. 2.
FIG. 6 is a schematic circuit diagram of the Direction Compare block of FIG. 2.
Figure 5:
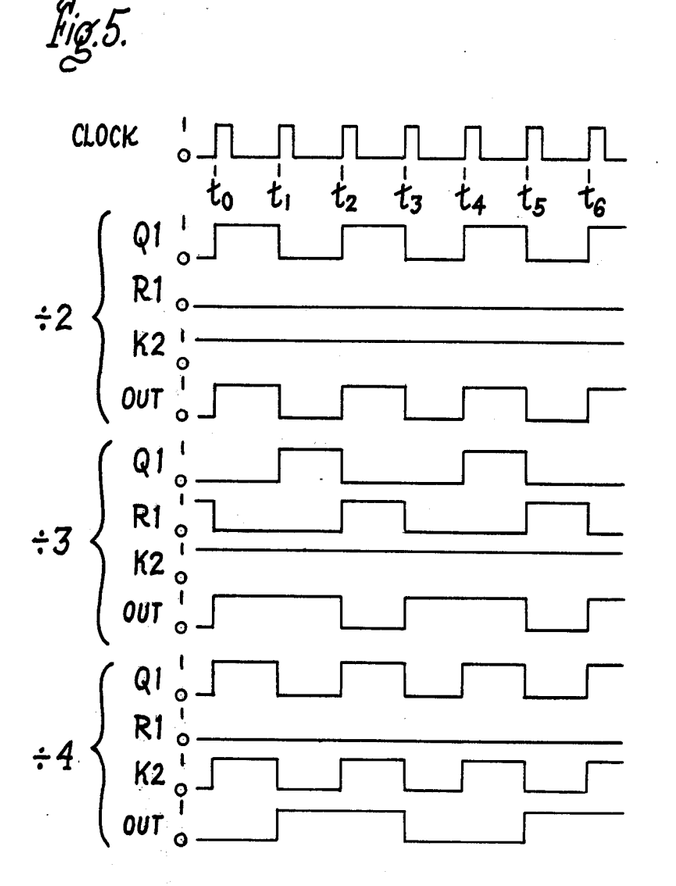
FIG. 5 is a timing diagram that illustrates the operation of the Divider in each of three different modes.

The individual trains of pulses generated by the synchronizer 36 are fed over lines T11, T12, etc. to the adding means 40. As is shown in FIG. 4, the adding means 40 preferably comprises a conventional exclusive OR logic gate 96 having a pair of inputs to which the lines T11 and T12 are respectively connected, whereby the output of the gate 96 is in a high or "1" state only when a "1" pulse is being supplied on one but not on both of the two lines T11 and T12. If lines T13 and T14 were used, they would be connected to the inputs of another exclusive OR logic gate 97 in the adder 40. The output of the second gate 97 is connected to one input of a third gate 98 which is a duplicate of gates 96 and 97, with the output of the first gate 96 being connected to the other input of the third gate. Consequently the output of the latter gate will be in a low or "0" state except during intervals when an odd number of the inputs from the individual pulse train lines T11, T12, etc. is high. It will therefore be apparent that the output of the gate 98 changes state each time that any one of these inputs changes state. Due to the previously described synchronizing action, only one input can change states at a time, and therefore the possibility of the adder not responding to two overlapping or simultaneous input state changes is avoided. Thus the adder 40 provides a single train of discrete output pulses having a frequency equal to the sum of the frequencies of the individual pulse trains on lines T11, T12, etc. These output pulses are conveyed via the line 41 to the frequency doubling means 42.

As can be seen in FIG. 4, the frequency doubler circuit 42 preferably comprises an exlusive OR gate 101 having two inputs and one output. The output pulses from the adder 40 are fed directly into the first input of gate 101 and via a resistor 102 into the second input which is also connected through a capacitor 103 to ground. The junction between resistor 102 and capacitor 103 is connected to the anode of a diode 104, with the cathode thereof being connected to a control power terminal 105 of relatively positive potential (e.g., +15 volts). So long as both inputs to the gate 101 are in agreement, the output from this gate will be low or "0". Each time the signal on the output line 41 from the summing circuit 40 changes state, corresponding changes occur immediately at the first input of the gate 101 but later at the second input where abrupt changes are prevented by the capacitor 103. This delay will cause the output of the gate 101 temporarily to go high for a period of time determined by the RC time constant of resistor 102 and capacitor 103 and by the threshold level of the gate. The period of a high or "1" output is selected to accommodate both the minimum interval between consecutive state changes of the output pulses from the adder 40 and the minimum pulse width required by the frequency dividing means 44. In practice the RC time constant can be approximately 40 percent of the minimum interval between consecutive state changes of the signal on line 41. It will now be apparent that the output of the circuit 42 comprises a train of "1" pulses having a relatively short pulse width and twice the frequency of the single train of output pulses provided by the adder 40.

The double-frequency digital output signal from the frequency doubler circuit 42 is supplied via the line 43 to the divider circuit 44 which preferably comprises a pair of cyclically operative type J-K flip-flop devices 107 and 108. As is shown in FIG. 4, the line 43 is connected to the clock inputs CL of both of the devices 107 and 18. Both the J and the K inputs of the first device 107 are connected to a positive control power terminal, whereby these inputs are continuously high. The Q output of the device 107 is connected over a line Q1 to the J input of device 108. The Q bar output of device 107 is connected to the K input of the second device 108 through a circuit comprising, in series, a resistor 109, a terminal 110, an inverter 114, and a line K2. The Q output of the device 108 is connected through a feedback resistor 112, a terminal 113, and a line R1 to the reset input R of the device 107. The Q bar output of the device 108 is connected to the output line 48 of the divider 44.

The divider circuit 44 also receives an input from the selector block 47 to which its terminals 110 and 113 are connected via the lines 45 and 46, respectively. The selector 47 comprises suitable means for selectively grounding the terminals 110 and 113 in the circuit 44. In FIG. 4 the selector 47 is shown in simplified form as a pair of switches X and Y; by closing switch X, the line 45 (and hence the terminal 110) will be connected to ground; by closing switch Y, the line 46 (and hence terminal 113) will be grounded. These switches are preset so that Y alone is closed if four speed sensors are being used in the system, X alone is closed if three speed sensors are being used, and both X and Y are closed if only two speed sensors (24 and 25) are being used.

Each of the J-K flip-flop devices 107 and 108 is operative to change the states of its Q and Q bar outputs in response to 0-to-1 transitions of the signal applied to its CL input, provided that the associated J and K inputs have appropriate values. If $J=1$ and $K=0$ just before such transition of the clock signal, Q bar will be set to 0 in response to the transition. If $K=1$ and $J=0$ just before the transition, Q bar will be set to 1 in response thereto. If both J and K are 1 just prior to the transition, the Q bar output will change states in response thereto, whereas if both J and K were 0 the Q bar output would not change states. With the two devices 107 and 108 interconnected as shown in FIG. 4, the frequency of the digital signal obtained at the output line 48 of the divider circuit 44 will equal the frequency of the double-frequency signal applied to the clock inputs of these devices divided by either 2, 3, or 4, depending on the setting of the switches X and Y in the selector block 47.

When only two speed sensors are being used, both of the switches X and Y are closed, and the divider circuit 44 will operate in a divide-by-2 mode. In this mode, both of the terminals 110 and 113 are grounded, whereby the signal on the reset input line R1 of the first device 107 is continuously 0 and the signal on the K input line K2 of the second device 108 is continuously 1. Now the state of the Q bar output of the second device (i.e., the signal on the output line 48 of the divider 44) changes from 0 to 1 concurrently with every second 0-to-1 transition of the clock signal. In order to understand the divide-by-2 mode of operation, refer to FIG. 5 and assume that initially both the signal on the line Q1 and the output signal of the divider 44 are 0. At time $t_0$ a 0-to-1 transition of the clock signal (i.e., the double-frequency pulses applied to the CL inputs of the devices 107 and 108) causes the Q1 signal to change to a 1 state and simultaneously causes the output signal to also change to a 1 state. After one cycle of the double-frequency clock signal, at time $t_1$, there is another 0-to-1 transition of this signal, and now both the Q1 signal and the output signal simultaneously change states from 1 to 0. The next 0-to-1 transistion of the clock signal occurs at time $t_2$ which marks the end of a second cycle of this signal, and it causes simultaneous state changes of the Q1 and output signals from 0 to 1. Thus the divider circuit 44 requires two consecutive clock pulses to complete one full cycle of operation.

When a total of three speed sensors are being used, the switch X is closed and the switch Y is open in the selector block 47, and the divider 44 will operate in a divide-by-3 mode. In this mode, the terminal 110 is grounded but the terminal 113 is not grounded, whereby the signal on the input line K2 of the second flip-flop device 108 is continuously 1 and the signal on the reset line R1 of the first device 107 tracks the Q output of the second device 108. Now the state of the divider output signal changes from 0 to 1 concurrently with every third 0-to-1 transition of the clock signal. The divide-by-3 mode of operation will be summarized with reference to FIG. 5. At time $t_0$ the 0-to-1 transition of the clock signal causes the output signal to change from its initial 0 state to a 1 state, but a corresponding state change of the Q1 signal is prevented at this time because of the initially high signal on the reset line R1 of the first flip-flop device 107. However, when the output signal changes from 0 to 1 the R1 signal changes from 1 to 0. Consequently the next 0-to-1 transition of the clock signal, at $t_1$, causes the Q1 signal to change to a 1 state, but it does not cause any state change of the output signal which remains 1 because, just before $t_1$, the J and K inputs of the second device 118 were 0 and 1, respectively. After a second cycle of the double-frequency clock signal, at time $t_2$, there is another 0-to-1 transition of this signal, and now both the Q1 signal and the output signal simultaneously change states from 1 to 0. At the same time the state of the R1 signal changes from 0 to 1. The next 0-to-1 transition of the clock signal occurs at time $t_3$ which marks the end of a third cycle of this signal, and it causes simultaneous state changes of the output signal from 0 to 1 and of the R1 signal from 1 to 0. Note that the Q1 signal remains 0 at this time because, just before $t_3$, the R1 signal on device 107 was high. It will now be apparent that the divider circuit 44 requires three consecutive clock pulses to complete one full cycle of operation in the divide-by-3 mode.

When four speed sensors are being used, the switch Y is closed and the switch X is open in the selector block 47, and the divider 44 will operate in a divide-by-4 mode. In this mode, the terminal 113 is grounded but the terminal 110 is not grounded, whereby the R1 signal is continuously 0 and the K2 signal tracks the Q1 signal. Now the state of the output signal of the divider changes from 0 to 1 concurrently with every fourth 0-to-1 transition of the clock signal. The divide-by-4 mode of operation will be summarized with reference to FIG. 5. At time $t_0$ both the Q1 signal and the K2 signal change from their initial 0 state to a 1 state, but there is no corresponding change of the output signal because both the J and K inputs of the second flip-flop device 108 were 0 just before $t_0$. At time $t_1$, both the Q1 and K2 signals change states from 1 to 0, and the output signal simultaneously changes from its initial 0 state to 1. At time $t_2$ the Q1 and K2 signals again change to a 1 state, but the output signal remains unchanged because both of the J and K inputs of the device 108 were 0 just before $t_2$. At time $t_3$ the Q1, K2, and output signals all simultaneously change states from 1 to 0. The next 0-to-1 transition of the clock signal occurs at time $t_4$ which marks the end of a fourth cycle of this signal, and it causes simultaneous state changes of the Q1 and K2 signals from 0 to 1. However, there is no corresponding change of the output signal because both of the J and K inputs of device 108 were 0 just before $t_4$. It will now be apparent that the divider circuit 44 requires four consecutive clock pulses to complete one full cycle of operation in the divide-by-4 mode.

FIG. 6 shows the presently preferred embodiment of the vehicle directional comparing circuit 52 that is used to disable the tach adder 23 in response to a directional error. This circuit comprises a pair of inverters 115 and 117 and three conventional NAND logic gates 121, 122, and 123. The outputs of gates 121 and 122 are provided as two different inputs to the gate 123, and the output of the latter gate serves as the comparer output which is coupled by the line 51 to the synchronizer 36 (see FIGS. 2 and 3). The inputs to the NAND gate 122 constitute the respective outputs of the inverters 115 and 117 whose inputs in turn are supplied by the signals on the lines 26 and 28, respectively. The lines 26 and 28 are also connected to the two inputs of the NAND gate 121. The signal on line 26 is received from the directional command module 22 (FIG. 1); it is in a high or "1" state whenever the desired direction is forward but in a low or "0" state whenever the desired direction is reverse. The signal on line 28 is derived from the vehicle direction sensor 29 (FIG. 1); it is "0" when the actual direction is forward and "1" when the actual direction is reverse.

If the actual direction of the vehicle is the same as the desired direction, the state of the signal on the line 26 will be opposite to the signal state on line 28, and the comparer 52 shown in FIG. 6 has a low or "0" output. In this case both of the gates 121 and 122 have "1" outputs, and consequently the gate 123 will have a "0" output. In the case of directional disagreement, however, there will be either concurrent "1" signals or concurrent "0" signals on the two lines 26 and 28. So long as there are concurrent "1" signals on both lines, the output of the gate 121 is "0." This puts a "0" on one input to the gate 123 which must then have a "1" output. Similarly, so long as there are concurrent "0" signals on lines 26 and 28, both inputs to the gate 122 are "1" and this gate must have a "0" output. This again puts a "0" on one input to the gate 123, and the comparer 52 is then effective to produce a "1" signal on the output line 51. A "1" signal on line 51 therefore indicates a discrepancy between commanded and actual directions of the vehicle. In the synchronizer 36, such a signal resets the flip-flop devices, and the signals on all of the lines, T11, T12, etc. will now be continuously high. This causes the outputs of the frequency adder 40 and the frequency doubler 42 to be continuously low. So long as there are no 0-to-1 transitions of the double-frequency signal applied on line 43 to the CL inputs of the flip-flop devices in the divider 44, the latter component stops producing a digital signal on its output line 48, and the speed feedback signal on line 18 is effectively suppressed.

While a preferred embodiment of the invention has been shown and described by way of example, many modifications will undoubtedly occur to persons skilled in the art. The concluding claims are therefore intended to cover all such modifications as fall within the true spirit and scope of the invention.

I claim:

1. An electric propulsion system for a traction vehicle having a plurality of axle-wheels sets, comprising:
   a. a plurality of adjustable speed, 3-phase a-c motors, each of said motors having stator windings and a rotor, with the rotors of the respective motors being mechanically coupled to separate axle-wheel sets of the vehicle;
   b. a corresponding plurality of speed sensing means coupled to the rotors of the respective motors, each of said speed sensing means being arranged to supply a separate digital input signal having a frequency that varies with the angular velocity of the associated rotor;
   c. means including a controllable electric power inverter for supplying 3-phase a-c power to the stator windings of all of said motors;
   d. means for varying the fundamental amplitude of the a-c power supplied to said motors;
   e. means responsive to an excitation frequency control signal for controlling the operation of said inverter so as to vary the fundamental frequency of said a-c power as desired;
   f. means for developing said excitation frequency control signal and for varying the same as a function of the frequency of a digital speed feedback signal; and
   g. said speed feedback signal being provided by a circuit including (i) first means connected to all of said speed sensing means for developing a single train of discrete output pulses having a frequency proportional to the sum of the frequencies of the digital input signals supplied by the respective speed sensing means, and (ii) second means responsive to said output pulses and to the number of said speed sensing means for producing a digital speed feedback signal having a frequency proportional to the frequency of said output pulses divided by the number of speed sensing means, whereby the frequency of said speed feedback signal is representative of the average angular velocity of the respective rotors of said motors.

2. The propulsion system according to claim 1 wherein said first means comprises a source of repetitive clock pulses having a relatively high, constant frequency, synchronizing means responsive to said clock pulses and to the digital input signals supplied by all of said speed sensing means for generating a plurality of individual trains of pulses having frequencies that are respectively determined by the frequencies of said input signals, the pulses in each of said individual trains being synchronized with a different series of said clock pulses so that their leading and trailing edges are not coincident with the edges of pulses in any other train, and adding means responsive to the pulses in all of said individual trains for providing said single train of output pulses.

3. The propulsion system according to claim 2, wherein said source of clock pulses comprises a multiphase clock that provides a different series of clock pulses for each of the individual trains of pulses generated by said synchronizing means, and wherein the leading and trailing edges of the pulses in each of said individual trains are coincident with leading edges of clock pulses in the associated series.

4. The propulsion system according to claim 2, wherein said adding means has a plurality of inputs to which said individual pulse trains are respectively supplied and an output at which said output pulses are provided, said adding means being so arranged that its output state changes in response to every solitary state change of the pulses supplied to any of said inputs.

5. The propulsion system according to claim 1, wherein said second means comprises means for developing a double-frequency digital signal having a frequency equal to twice the frequency of said output pulses and cyclically operative means for dividing the frequency of said double-frequency signal by the number of said speed sensing means to obtain said digital speed feedback signal.

6. The propulsion system according to claim 5, wherein said double-frequency signal comprises a train of pulses having a relatively short pulse width, and wherein said cyclically operative means is arranged to complete one full cycle of operation in response to every n consecutive pulses in the last-mentioned train, where n is the number of said speed sensing means.

7. A propulsion system according to claim 1, wherein the phase sequence of said 3-phase power, and hence the direction of rotation of the motor rotors, is determined by a vehicle directional command, and further comprising means responsive to any discrepancy between the commanded and the actual directions of the vehicle for disabling said circuit and thereby suppressing said speed feedback signal.

8. A circuit for processing a plurality of digital input signals having frequencies that are respectively indicative of the speeds at which the rotors of a plurality of adjustable speed electric motors are rotating, comprising:
   a. a source of repetitive clock pulses having a relatively high, constant frequency;
   b. synchronizing means responsive to said clock pulses and said plurality of input signals for generating a plurality of individual trains of pulses having frequencies equal to the frequencies of the respective input signals, the pulses in each of said individual trains being synchronized with a different series of said clock pulses so that their leading and trailing edges are not coincident with the edges of pulses in any other train; and
   c. adding means responsive to the pulses in all of said individual trains for providing a single train of discrete output pulses having a frequency equal to the sum of the frequencies of said input signals.

9. A circuit according to claim 8 and further comprising means responsive to said output pulses and to the number of said input signals for producing a digital speed signal having a frequency proportional to the frequency of said output pulses divided by the number of said input signals, whereby the frequency of said digital speed signal is representative of the average rotational speeds of said motors.

10. The circuit according to claim 8, wherein said source of clock pulses comprises a multi-phase clock that provides a different series of clock pulses for each of the individual trains of pulses generated by said synchronizing means, and wherein the leading and trailing edges of the pulses in each of said individual trains are coincident with leading edges of clock pulses in the associated series.

11. The circuit according to claim 8, wherein said adding means has a plurality of inputs to which said individual pulse trains are respectively supplied and an output at which said output pulses are provided, said adding means being so arranged that its output state changes in response to every solitary state change of the pulses supplied to any of said inputs.

12. A circuit for processing a plurality of digital input signals having frequencies that are respectively indicative of the speeds at which the rotors of a plurality of adjustable speed electric motors are rotating, comprising:
   a. first means responsive to all of said digital input signals for developing a single train of discrete output pulses having a frequency proportional to the sum of the input signal frequencies;
   b. means connected to said first means for developing a double-frequency digital signal having a frequency equal to twice the frequency of said output pulses; and
   c. cyclically operative means responsive to said double-frequency signal and to the number of said input signals for producing a digital speed signal having a frequency equal to the frequency of said double-frequency signal divided by the number of said input signals, whereby the frequency of said digital speed signal is representative of the average rotational speeds of said motors.

13. The circuit according to claim 12, wherein said double-frequency signal comprises a train of pulses having a relatively short pulse width, and wherein said cyclically operative means is arranged to complete one full cycle of operation in response to every n consecutive pulses in the last-mentioned train, where n is the number of said input signals.

14. The circuit according to claim 12, wherein said first means comprises (i) a source of repetitive clock pulses having a relatively high, constant frequency, (ii) synchronizing means responsive to said clock pulses and to said plurality of input signals for generating a plurality of individual trains of pulses having frequencies equal to the frequencies of the respective input signals, the pulses in each of said individual trains being synchronized with a different series of said clock pulses so that their leading and trailing edges are not coincident with the edges of pulses in any other train, and (iii) adding means responsive to the pulses in all of said individual trains for providing a single train of discrete output pulses having a frequency equal to the sum of the frequencies of said input signals.

* * * * *